INVENTOR
PHILIP BLISS
BY M. B. Tasker
ATTORNEY

INVENTOR
PHILIP BLISS
BY M. B. Tasker
ATTORNEY 3,166,901
DETECTOR FOR ALKALI-METAL VAPORS
Philip Bliss, Newington, Conn., assignor to United Aircraft Corporation, East Hartford, Conn., a corporation of Delaware
Filed Feb. 13, 1962, Ser. No. 173,091
10 Claims. (Cl. 60—39.09)

This invention relates to a device for detecting liquid lithium or other alkali metals, or the vapors thereof, under high-temperature conditions, in inert atmospheres, in a vacuum, in air, or in other gases.

In connection with the work done toward building an indirect-cycle aircraft nuclear-propulsion powerplant, it became a pressing need to develop a simple liquid-metal leak detector on the down-stream air side of the radiator which could dependably detect a pinhole type of leak in the radiator.

An object of this invention is the provision of a leak detector adapted for use in nuclear-powered gas-turbine engines.

A further object of this invention is the provision of a leak detector of this type which is simple and reliable in operation. Preferably, it should be a nonelectronic, on-off device, which would signal a failure, or leak, by means of an indicator at the pilot's panel.

A still further object of this invention is generally to provide an improved leak detector capable of detecting the presence of alkali metals in a vacuum or in any gas-filled chamber.

These and other objects and advantages of the invention will become evident or will be pointed out in connection with the description of several embodiments of the invention shown by way of illustration in the accompanying drawings.

Figure 1:
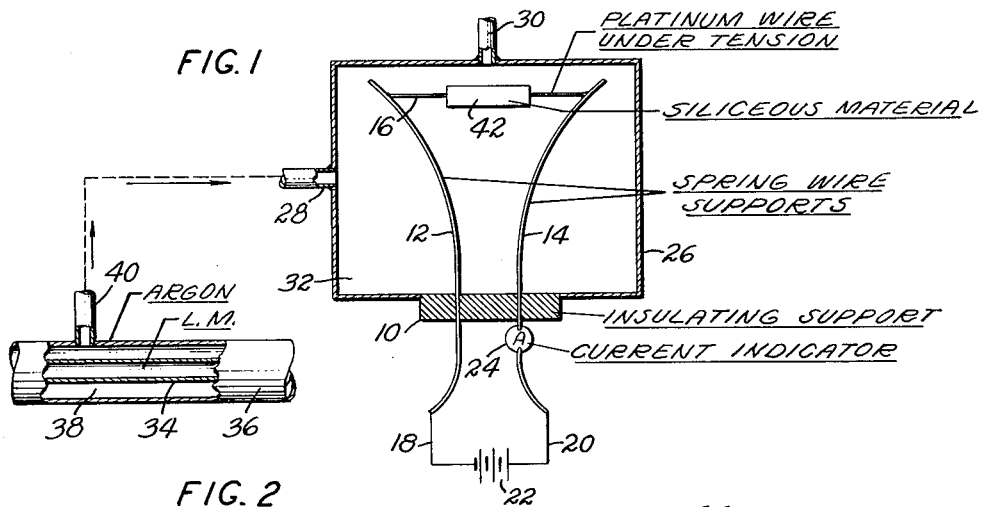
FIG. 1 is a sectional view showing the leak detector of this invention operatively connected to the atmosphere surrounding a liquid-metal conductor.

As shown in FIG. 1, the detector of this invention comprises an insulating support 10 for two spaced conductors 12 and 14, the upper free ends of which are connected by a platinum wire 16. As herein shown, both conductors are inherently resilient and are biased apart by their own resilience so that the wire 16 is held taut, although it is feasible to have one wire nonresilient if desired.

Conductors 12 and 14 are made a part of an electrical circuit including wires 18 and 20, which are connected to the lower ends of the conductors 12 and 14 and connect them to the terminals of a storage battery 22 or some other source of electric current. Also included in the circuit, as for example in wire 20 and one of the conductors, is a current indicator or ammeter 24. Obviously, this ammeter, which indicates the current flowing in the circuit, may be located in some remote place, if desired, so long as it is included in series in the circuit.

The free ends of conductors 12 and 14 are enclosed in a housing 26 which is provided with a fluid inlet 28 and a fluid outlet 30, so that a stream of gaseous fluid can be continuously passed through the chamber 32 within the housing and over the wire 16. In FIG. 1, the detector is operatively associated with a pipe 34 containing liquid metal. This pipe is enclosed in a concentric and larger pipe 36 which provides a space 38 surrounding the pipe 34 adapted to contain air or some other gas, for example, an inert gas. In either case, the space 38 surrounding chamber 32 communicates through a pipe 40 with the intake 28 of chamber 32 as a part of a circulating system including the space 38 and the chamber 32.

A body of siliceous material 42 is located in contact with the platinum wire 16. As shown herein, it is carried by the wire. This body of siliceous material 42 may be any material containing silicon which will readily give up its silicon in the presence of alkali fluids, for example, liquid lithium or its vapors. The silicon liberated very readily forms a relatively low-melting point platinum-silicon alloy of the wire 16. The platinum-silicon wire melts at about 830° C. and, in terming this a relatively low-melting point alloy, I mean that it has a low-melting point relative to the melting point of unalloyed platinum which is 1769° C. The sensitivity of the reaction to the presence of lithium vapors appears to be very high. For example, complete failure of platinum thermocouples has occurred in columbium wells made of commercial quality of columbium, thoroughly sealed, by welding, against lithium penetration. The quantity of lithium present was so small that its detection was difficult, yet the platinum wire in the thermocouple was completely fused and was fused to the siliceous thermocouple-insulating material. The presence of siliceous electric- or thermal-insulating material was sufficient to effect the reaction with these alkali fluids.

Figure 2:
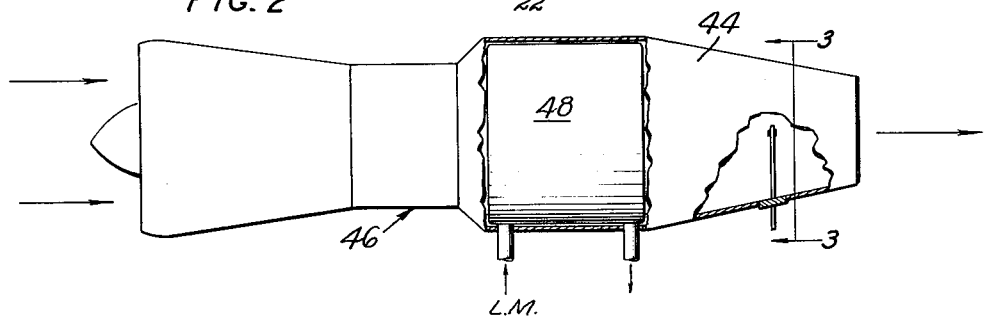
FIG. 2 is a sectional elevation of the same detector applied to a gas-turbine engine having a liquid-metal-circulating radiator upstream of the turbine.

In FIG. 2, the detector of FIG. 1 has been shown installed in the diffuser 44 of a gas-turbine engine 46. Here, the usual burner cans have been replaced by a radiator 48 through which liquid lithium is circulated to transfer heat from a nuclear reactor to the engine. Even the slightest pinpoint leak in the radiator will liberate sufficient lithium vapor to actuate the detector.

In the operation of the detector, as shown in FIG. 1, argon gas in the space 38 is circulated through pipe 40 through inlet 28 into chamber 32, where it comes in contact with the wire 16 and the material 42 carried thereby, before it passes out of the outlet 30. It will be understood that the inert gas, for example argon, can then be carried by a pipe (not shown) back to the space 38 from which it again circulates through the chamber 32, or it may be discharged to atmosphere.

If a leak occurs in the pipe 34, lithium fluid, either in the form of liquid metal or its vapors, will be picked up by the circulating argon gas and will come in contact with material 42 in chamber 32, causing it to liberate silicon in amounts sufficient to alloy the platinum wire to form platinum-silicon, which, relative to the melting point of platinum, is a low-melting point alloy. As a result the wire 16 will rupture due to the tension of the conductors 12 and 14 and the fusing of wire 16 as a result of the current flowing in the circuit. This opens the circuit and the zero reading on the ammeter indicates that there is a leak in the liquid-metal system. Obviously, this indication can be further used to operate a no-current relay in a well-known manner, if desired.

Figure 3:
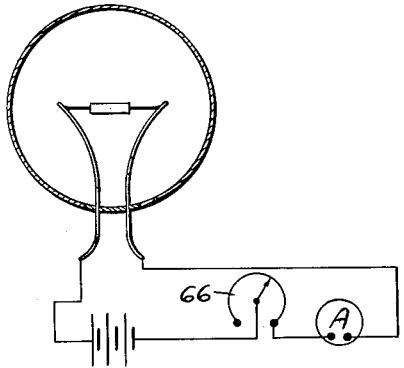
FIG. 3 is a detail on line 3—3 of FIG. 2.
Figure 4:
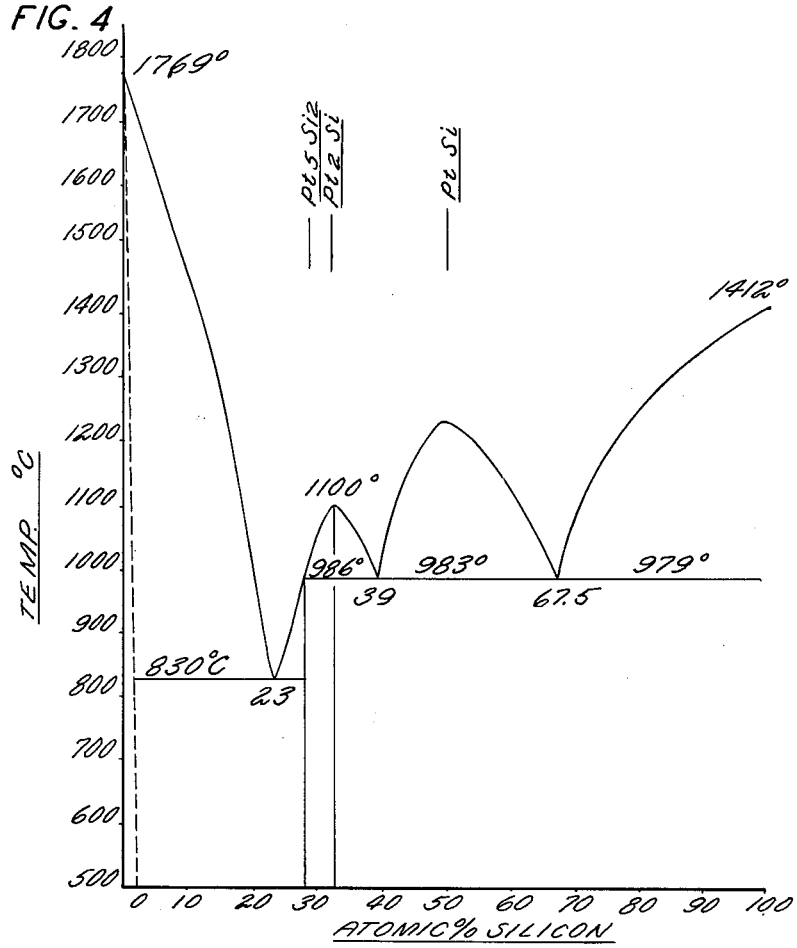
FIG. 4 is the platinum-silicon phase diagram.

The operation of FIGS. 2 and 3 is believed to be obvious from the above description. Here, a large volume of air is passed through the gas-turbine engine diffuser on the downstream air side of the radiator. Even the most minute leak in the radiator will result in alloying of wire 16 and its rupture.

Figure 6:
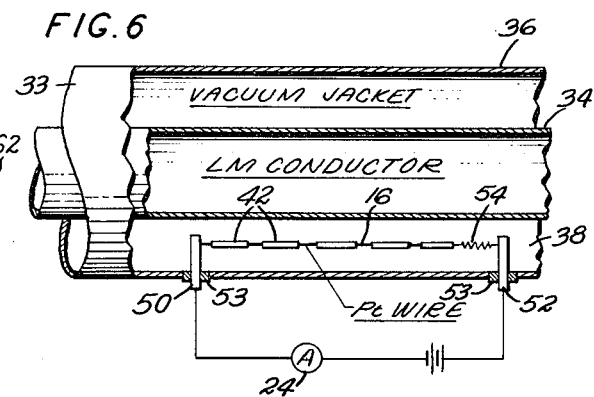
FIG. 6 is a further modified showing of the invention.

In FIG. 6, a modification of FIG. 1 has been shown, in which the liquid-metal-conveying pipe 34 is enclosed in a larger diameter pipe 36 to provide a space 38 between the pipes which, in this form of the invention, is sufficiently large to permit the installation of the detector in the space 38. This is desirable when the space 38 is evacuated. Here, two rigid wire supports 50 and 52 of electrical-conducting material are provided in a short section of pipe 33. These supports are carried into chamber 38 through insulating bushings 53 which also form a vacuum-tight seal between the supports and the pipe wall. The platinum wire 16 is strung between these supports with a spring 54, which also is a good electrical conductor, in series therewith. One or more sleeves of siliceous material 42 are strung on wire 16 in spaced relation so that upon the occurrence of a leak in pipe 34 in the vicinity of wire 16, the detector will operate to open the circuit. Ammeter 24 will give visual indication that there is a leak at this point in the pipe.

If desired, additional supports similar to 50, 52 may be provided along the length of pipe 34 and other liquid-conducting pipes in the system. By connecting adjacent pairs of these supports in separate circuits, each with its battery 22 and ammeter 24, it is possible, not only to detect a leak in the piping system, but to indicate where the leak is located. If desired, the ammeters in the several circuits can be grouped at some common location for convenience in inspecting the system for leaks. Thus, by including suitable valving in the system, it would be possible to completely isolate a leak without shutting down the entire installation.

Preferably, in order to obtain maximum sensitivity, in the forms shown in FIGS. 1–3 and 6, the platinum wire 16 should be run at a temperature between the melting point of unalloyed platinum (1769° C.) and the melting point of the platinum-silicon eutectic, which may be seen from the phase diagram to be approximately 830° C. In order to do this, a rheostat 66 (FIG. 3) may be connected in series in the battery circuit of these figures, which is adjustable to vary the resistance included in the circuit. By adjusting rheostat 66, the amount of current flowing in the wire 16 can be regulated so that the temperature of the wire is, in normal operation, below the 1769° C. melting point of the platinum wire and above the 830° melting point of the platinum-silicon eutectic. Then, whenever a leak occurs and the platinum wire becomes alloyed with silicon, the circuit is interrupted without delay.

Figure 5:
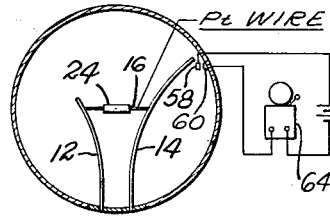
FIG. 5 is a modification of FIG. 1.

Under some conditions, for example, when the detector is located in a very hot environment as in FIGS. 2 and 3, the detector of this invention is capable of operating without any electrical current in the wire 16. The temperature of the gases must, of course, be between 1769° C. and the melting temperature of the platinum-silicon eutectic. One such arrangement has been illustrated in FIG. 5. Here, the platinum wire 16 carrying the siliceous material 24 is connected between supports 12 and 14, exactly as in FIG. 1, the support 14 being resilient and being held by wire 16 against lateral movement due to its resilience. As distinguished from the FIG. 1 form, supports 12 and 14 and wire 16 are not connected in an electric circuit. Instead, when an alkali metal or its gases is present in the hot exhaust gases passing over wire 16, the platinum-silicon alloy of the platinum wire fuses due to the heat of the hot gases. Support 14 is then released and engages a movable contact 58, causing the latter to engage a cooperating contact 60. Contacts 58 and 60 are connected in a circuit with a battery 62, which also includes an audible alarm device 64 which is operated whenever contacts 58 and 60 engage.

It will be evident from the above that by this invention a very sensitive device has been provided for the detection of alkali liquid metals and their vapors, of which lithium is used here only as one example. Other alkali metals with which the detector of this invention may be associated are NaK, Na, K, Rb and Cs. It will further be evident that this device is extremely sensitive to the presence of alkali metals and their vapors, so that an early warning of a leak will be given.

The device is also extremely simple and inexpensive, so that it is feasible to locate detectors throughout the liquid-metal system.

It will further be noted that the detector of this invention can be used in a vacuum without losing its sensitivity.

Several embodiments of the invention have been shown herein. However, it will be evident that other changes may be made in the construction and arrangement of the parts of the detectors without departing from the scope of the invention as defined by following claims.

I claim:
1. A device for detecting the presence of alkali-metal fluids comprising a platinum wire, means for normally heating said wire to a temperature below the melting point of platinum, means for forming a platinum-silicon alloy of said platinum wire in the presence of an alkali metal including a siliceous material maintained in contact with said wire, said alloy having a melting point below that temperature to which said wire is normally heated, said siliceous material characterized by having silicon liberated by the reaction therewith of alkali metals and their vapors, and indicating means responsive to the melting of said wire.

2. A device for detecting the presence of alkali-metal fluids comprising a platinum wire, means for normally heating said wire to a temperature of about 1769° C. but below the melting point of platinum, means for forming a platinum-silicon alloy of said platinum wire in the presence of an alkali metal including a siliceous material maintained in contact with said wire, said alloy having a melting point of about 830° C., said siliceous material characterized by having silicon liberated by the reaction therewith of alkali metals and their vapors, and indicating means responsive to the melting of said wire.

3. A detector for alkali-metal fluids comprising a platinum wire, means including spaced supports for supporting said wire, means for passing a stream of hot gases over said wire, said gases having a temperature below the temperature at which said wire melts, means for forming a platinum-silicon alloy of said wire in the presence of an alkali metal including a siliceous material adjacent said wire characterized by having silicon liberated by the reaction therewith of alkali metals or their vapors, said alloy having a melting point which is below the temperature of said gases, and indicating means responsive to the melting of said wire.

4. In a gas-turbine engine having a radiator for the circulation of an alkali metal, a detector for the presence of alkali metals or their vapors located downstream of the air passing through said radiator, said detector including a platinum wire supported in the hot gases discharged from said engine, said discharge gases having a temperature below the melting point of said wire, means for forming a platinum-silicon alloy of said wire in the presence of an alkali metal including a siliceous material adjacent said wire characterized by having silicon liberated by the reaction therewith of alkali metals and their vapors, said alloy having a melting point below the temperature of said gases, and means responsive to the melting of said wire for indicating a leak in said radiator.

5. A detector for alkali-metal fluids comprising a metallic strip of platinum, means for supporting said strip in an electric circuit including electrical insulation, means for circulating a gaseous stream over said strip, means for passing an electric current continuously through said strip which normally heats said strip to a temperature below the melting point of platinum, means for fusing said strip upon the occurrence of an alkali-metal vapor in said stream comprising a siliceous material in contact with said fusible strip which forms a lower melting point platinum-silicon alloy of said strip in the presence of said alkali fluid, and indicating means responsive to the fusing of said strip.

6. The combination of claim 5 in which means is included in the electric circuit for varying the current normally flowing in the circuit and normally maintaining the temperature of said strip between the melting point of said platinum-silicon alloy and the melting point of platinum.

7. A detector for alkali metals and their vapors comprising an insulating support, an electric circuit including a pair of spaced conductors mounted on said support, at least one of which is resilient, a platinum wire connecting said conductors and held taut by said resilient conductor, said wire being mounted in an environment in which a stream of gas passes over it continuously, means for constantly passing an electric current through said circuit including said wire for heating said wire to a temperature below the melting point of platinum, and means for forming a platinum-silicon alloy of said wire in the presence of an alkali metal in said gas stream which has a tensile strength less than the strength of said resilient conductor including a siliceous material in proximity to said wire characterized by having silicon liberated by the reaction therewith of alkali metals and their vapors.

8. A detector for alkali-metal fluids comprising a metallic strip having a fusible section of platinum, means for supporting said strip in an electric circuit, said strip being mounted in an environment in which a stream of air passes over it continuously, means for passing an electric current continuously through said strip, said current normally heating said strip to a temperature below the temperature at which platinum melts a material supported in contact with the fusible section of said strip forming a low-melting point alloy with said strip which melts at the normal temperature of said strip upon the incidence of an alkali fluid in said airstream, and means in said circuit for indicating that said fusible section has melted.

9. A detector for alkali-metal vapors comprising an insulating support, an electric circuit including a pair of conductors carried by said support, at least one of which is resilient, and a platinum wire connecting the free ends of said conductors, means for passing an electric current through said circuit for normally heating said wire to a temperature below the melting point of platinum, means for continuously passing a fluid over said wire, a siliceous material in contact with said wire, said material having silicon liberated by reaction of alkali vapor in said fluid which alloys with platinum to form a low-tensile strength, low-melting point platinum-silicon alloy with said platinum which melts at a temperature below said normal temperature of said wire, and current-responsive means in said circuit for indicating rupture of said wire.

10. A detector for alkali-metal fluids comprising a platinum strip, means for supporting said strip in an electric circuit, said strip being mounted in an environment in which a stream of air passes over it continuously, means for passing an electric current continuously through said strip, a material supported in contact with said strip forming a low-melting point platinum-silicon alloy with said strip upon the incidence of an alkali fluid in said airstream, means in said circuit for indicating that said strip has melted, and a variable resistance in the electric circuit for maintaining the temperature of said strip normally between the melting point of the platinum and the melting point of the platinum-silicon eutectic.

References Cited by the Examiner

UNITED STATES PATENTS

| 522,232 | 7/94 | Sachs | 200—135 |
| 1,122,478 | 12/14 | Cole | 200—117 |
| 1,242,575 | 10/17 | Milano | 340—237 |
| 2,194,520 | 3/40 | Darrah | 340—237 |
| 2,270,404 | 1/42 | Bitter | 200—135 |
| 2,306,509 | 12/42 | Talmey | 73—26 |
| 2,518,909 | 8/50 | Krakaver | 200—117 |
| 2,703,352 | 3/55 | Kozacka | 200—135 |
| 2,841,545 | 7/58 | Zinn. | |
| 2,852,459 | 9/58 | Williamson. | |
| 2,921,167 | 1/60 | Dahlen | 200—117 |
| 2,974,495 | 3/61 | Pinnes. | |

SAMUEL LEVINE, *Primary Examiner.*

ABRAM BLUM, *Examiner.*